(12) United States Patent
Wang et al.

(10) Patent No.: US 10,742,879 B2
(45) Date of Patent: Aug. 11, 2020

(54) PANORAMIC CAMERA DEVICE

(71) Applicant: ASIA VITAL COMPONENTS CO., LTD., New Taipei (TW)

(72) Inventors: Wei-Chuan Wang, New Taipei (TW); Jing-Xia Pei, New Taipei (TW); Huan Deng, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 150 days.

(21) Appl. No.: 15/455,054

(22) Filed: Mar. 9, 2017

(65) Prior Publication Data

US 2018/0262682 A1  Sep. 13, 2018

(51) Int. Cl.
*H04N 5/232* (2006.01)
*H04N 5/225* (2006.01)
*G03B 11/00* (2006.01)

(52) U.S. Cl.
CPC ....... *H04N 5/23238* (2013.01); *H04N 5/2253* (2013.01); *H04N 5/2254* (2013.01); *H04N 5/2257* (2013.01); *H04N 5/2258* (2013.01)

(58) Field of Classification Search
CPC ........ G02B 13/06; G03B 11/00; G03B 37/00; H04N 5/2254; H04N 5/2258; H04N 5/23238; H04N 5/2252; H04N 5/2257; H04N 5/2253
See application file for complete search history.

(56) References Cited

U.S. PATENT DOCUMENTS

| | | | |
|---|---|---|---|
| 9,554,041 B1 * | 1/2017 | Shin ................... | H04N 5/23238 |
| 2004/0041911 A1 * | 3/2004 | Odagiri ................. | G06F 1/1632 |
| | | | 348/207.1 |
| 2005/0046740 A1 * | 3/2005 | Davis ................... | H04N 5/2254 |
| | | | 348/373 |
| 2012/0274800 A1 * | 11/2012 | Vakil .................... | H04N 5/2252 |
| | | | 348/222.1 |
| 2013/0258044 A1 * | 10/2013 | Betts-Lacroix .... | H04N 13/0242 |
| | | | 348/36 |
| 2018/0020160 A1 * | 1/2018 | Lin ...................... | H04N 5/2252 |

* cited by examiner

*Primary Examiner* — Mulugeta Mengesha
*Assistant Examiner* — Alazar Tilahun
(74) *Attorney, Agent, or Firm* — Jackson IPG PLLC; Demian K. Jackson

(57) ABSTRACT

A panoramic camera device includes: a first substrate having a first surface and an opposite second surface, a first camera module being disposed on the first surface, a first connection port being disposed on the second surface; and a second substrate having a third surface and a fourth surface opposite to the third surface. The fourth surface faces the second surface. A second camera module and a signal output port are disposed on the third surface. A second connection port is disposed on the fourth surface. The first connection port is connected with the second connection port. The first camera module on the first surface and the second camera module on the third surface are back-to-back arranged. The first and second camera modules are positioned in the same optical axis. The signal output port serves to output the image signals generated by the first and second camera modules.

5 Claims, 3 Drawing Sheets

PANORAMIC CAMERA DEVICE

BACKGROUND OF THE INVENTION

1. Field of the Invention

The present invention relates generally to a panoramic camera device, and more particularly to a panoramic camera device, which has a simplified structure and includes a signal output port for outputting image signals by one single line.

2. Description of the Related Art

A conventional camera module is formed of a lens. The wide-angle lens has a shooting angle of view generally limited within a range of 64~76 degrees. A super-wide-angle lens can have a shooting angle of view up to 84~110 degrees. Along with the continuous development of optical lens and imaging chip technique, the traditional visual system of the common camera module has failed to meet the requirements of many application situations due to the limited range of field of view. The wide-angle imaging is highlighted by the large field of view so that the current visual research is focused on the wide-angle imaging as a hot topic.

In the current panoramic shooting, a wide-angle camera module is used to panoramically take a set of photos. The photos are further combined into a panorama with professional software. The camera apparatus has become smaller and smaller for easy carriage. The conventional panoramic camera device is composed of multiple shooting lenses for achieving a panorama. The conventional panoramic camera device has the shortcomings of large volume and limited application range.

It is therefore tried by the applicant to provide a panoramic camera device to solve the problems of the conventional panoramic camera device.

SUMMARY OF THE INVENTION

It is therefore a primary object of the present invention to provide a panoramic camera device, which has a simplified structure and includes a signal output port for outputting multiple image signals by one single line.

To achieve the above and other objects, the panoramic camera device of the present invention includes: a first substrate having a first surface and a second surface opposite to the first surface, a first camera module being disposed on the first surface, a first connection port being disposed on the second surface; and a second substrate having a third surface and a fourth surface opposite to the third surface, the fourth surface facing the second surface of the first substrate, a second camera module and a signal output port being disposed on the third surface, a second connection port being disposed on the fourth surface, the first connection port of the second surface being connected with the second connection port of the fourth surface, the first camera module on the first surface and the second camera module on the third surface being back-to-back arranged, the first and second camera modules being positioned in the same optical axis, the signal output port serving to output the image signals generated by the first and second camera modules.

In the above panoramic camera device, the first camera module includes a first lens unit, a first lens seat unit, a first image processing unit and a first filter. The first lens seat unit is disposed on the first surface. The first lens unit is disposed on the first lens seat unit. The first image processing unit is disposed on the first surface corresponding to the first lens unit. The first filter is disposed on the first image processing unit corresponding to the first lens unit.

In the above panoramic camera device, the first lens unit is selected from a group consisting of a wide-angle lens, a zoom lens or a telephoto lens.

In the above panoramic camera device, the second camera module includes a second lens unit, a second lens seat unit, a second image processing unit and a second filter. The second lens seat unit is disposed on the third surface. The second lens unit is disposed on the second lens seat unit. The second image processing unit is disposed on the third surface corresponding to the second lens unit. The second filter is disposed on the second image processing unit corresponding to the second lens unit.

In the above panoramic camera device, the second lens unit is selected from a group consisting of a wide-angle lens, a zoom lens or a telephoto lens.

In the above panoramic camera device, the signal output port is connected to an electronic device. The first and second camera modules respectively generate a first image signal and a second image signal. The signal output port outputs the first and second image signals to the electronic device.

In the above panoramic camera device, the first and second substrates are printed circuit boards or flexible printed circuit boards.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
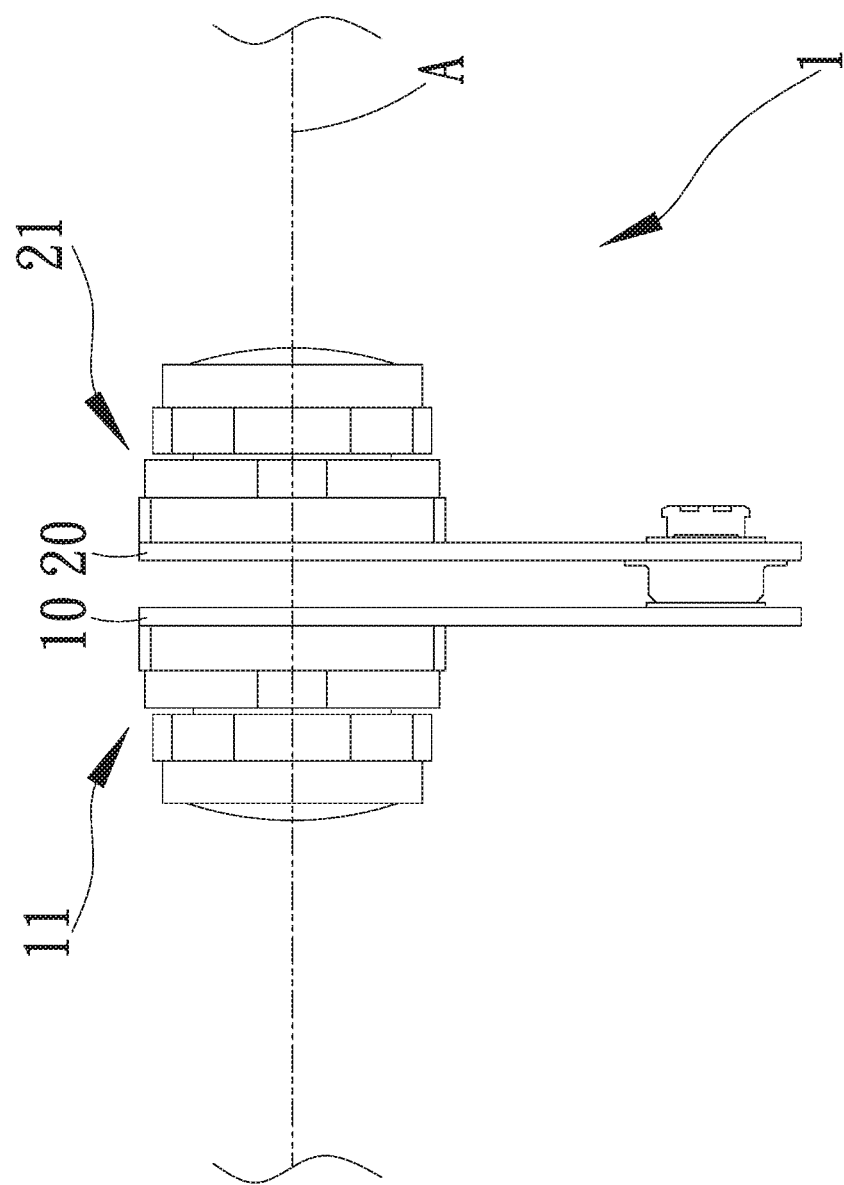
FIG. 1 is a side assembled view of the panoramic camera device of the present invention.
Figure 2:
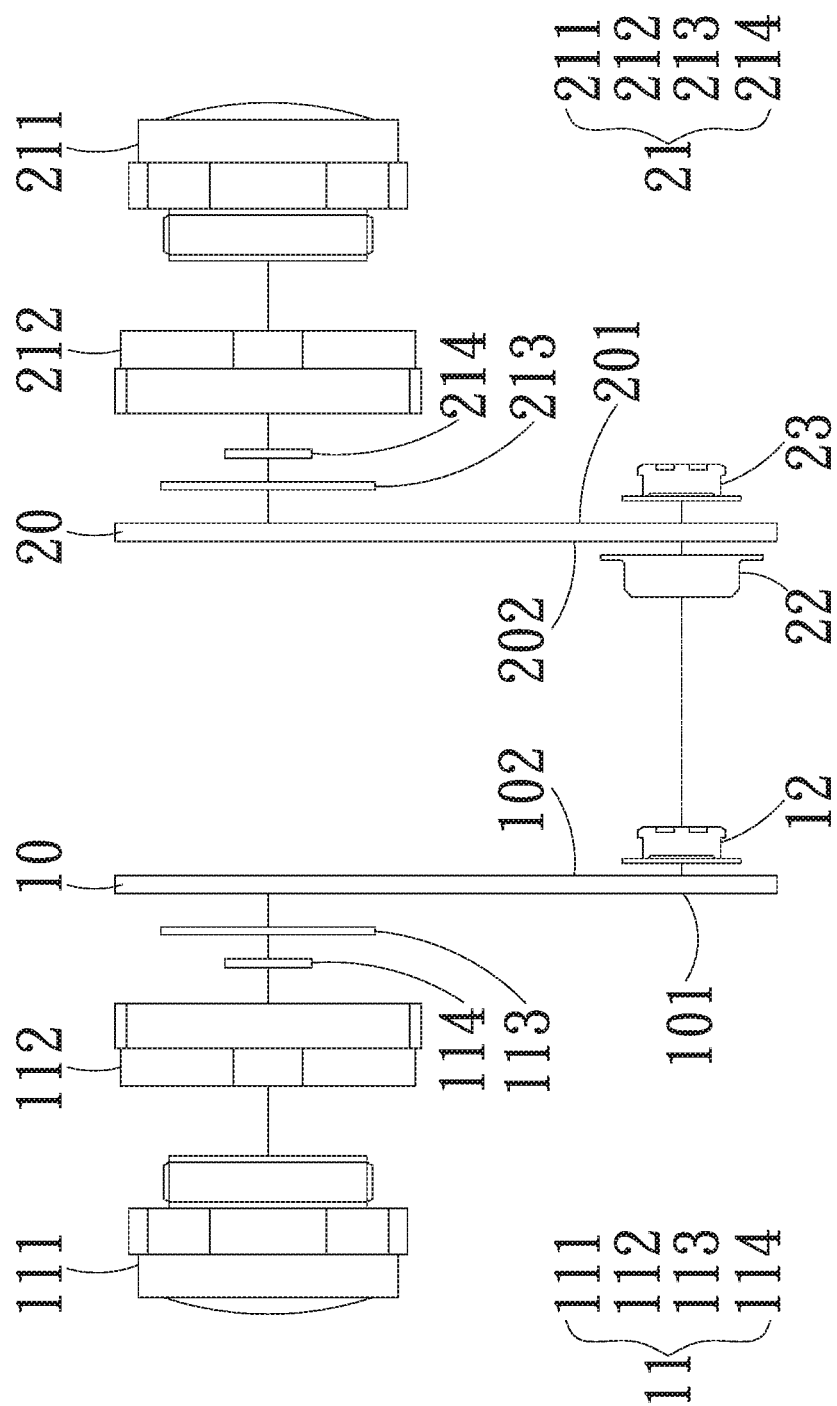
FIG. 2 is an exploded view of the panoramic camera device of the present invention.

Please refer to FIGS. 1 and 2. FIG. 1 is a side assembled view of the panoramic camera device of the present invention. FIG. 2 is an exploded view of the panoramic camera device of the present invention. As shown in the drawings, the panoramic camera device 1 of the present invention includes a first substrate 10 and a second substrate 20. A first camera module 11 is disposed on the first substrate 10. A second camera module 21 is disposed on the second substrate 20. A first connection port 12 and a second connection port 22 are respectively disposed on the first and second substrates 10, 20. The first connection port 12 is correspondingly connected with the second connection port 22. A signal output port 23 is further disposed on the second substrate 20.

The first substrate 10 includes a first surface 101 and a second surface 102. The first and second surfaces 101, 102 are positioned on two opposite faces of the first substrate 10. The first camera module 11 is disposed on the first surface 101. The first connection port 12 is disposed on the second surface 102. The second substrate 20 includes a third surface 201 and a fourth surface 202. The third and fourth surfaces 201, 202 are positioned on two opposite faces of the second substrate 20. The second camera module 21 and the signal output port 23 are disposed on the third surface 201. The second connection port 22 is disposed on the fourth surface 202. The first and second substrates 10, 20 are, but not limited to, printed circuit boards (PCB) or flexible printed circuit boards (FPCB). The first and second connection ports 12, 22 are a male connector and a female connector correspondingly mated with the male connector. The signal output port 23 is connected to an electronic device (not shown), such as, but not limited to, an intelligent mobile phone or a computer.

The first camera module 11 is positioned on the first surface 101. The first connection port 12 is positioned on the second surface 102. The second camera module 21 is positioned on the third surface 201. The second connection port 22 is positioned on the fourth surface 202. After the first and second connection ports 12, 22 are connected with each other, the second surface 102 faces the fourth surface 202. The first camera module 11 on the first surface 101 and the second camera module 21 on the third surface 201 are positioned in the same optical axis A in opposite to each other.

The first camera module 11 includes a first lens unit 111, a first lens seat unit 112, a first image processing unit 113 and a first filter 114. The first lens seat unit 112 is disposed on the first surface 101. The first lens unit 111 is disposed on the first lens seat unit 112. In a preferred embodiment, the first lens unit 111 and the first lens seat unit 112 are connected by means of screwing and the first lens unit 111 can be screwed to adjust the focal length to a best value. In an alternative embodiment, after screwed, the first lens unit 111 can be secured with an adhesive (such as a UV adhesive) to keep the best focal length. The first image processing unit 113 is disposed on the first surface 101 corresponding to the first lens unit 111. The first lens unit 111 is such as, but not limited to, a wide-angle lens, a zoom lens or a telephoto lens. The first image processing unit 113 is such as, but not limited to, a charge-coupled device (CCD) or a complementary metal-oxide-semiconductor (CMOS) active pixel sensor. The first filter 114 is disposed on the first image processing unit 113 corresponding to the first lens unit 111. The first filter 114 is such as, but not limited to, an infrared filter.

The second camera module 21 includes a second lens unit 211, a second lens seat unit 212, a second image processing unit 213 and a second filter 214. The second lens seat unit 212 is disposed on the third surface 201. The second lens unit 211 is disposed on the second lens seat unit 212. In a preferred embodiment, the second lens unit 211 and the second lens seat unit 212 are connected by means of screwing and the second lens unit 211 can be screwed to adjust the focal length to a best value. In an alternative embodiment, after screwed, the second lens unit 211 can be secured with an adhesive (such as a UV adhesive) to keep the best focal length. The second image processing unit 213 is disposed on the third surface 201 corresponding to the second lens unit 211. The second lens unit 211 is such as, but not limited to, a wide-angle lens, a zoom lens or a telephoto lens. The second image processing unit 213 is such as, but not limited to, a charge-coupled device (CCD) or a complementary metal-oxide-semiconductor (CMOS) active pixel sensor. The second filter 214 is disposed on the second image processing unit 213 corresponding to the second lens unit 211. The second filter 214 is such as, but not limited to, an infrared filter.

Figure 3:
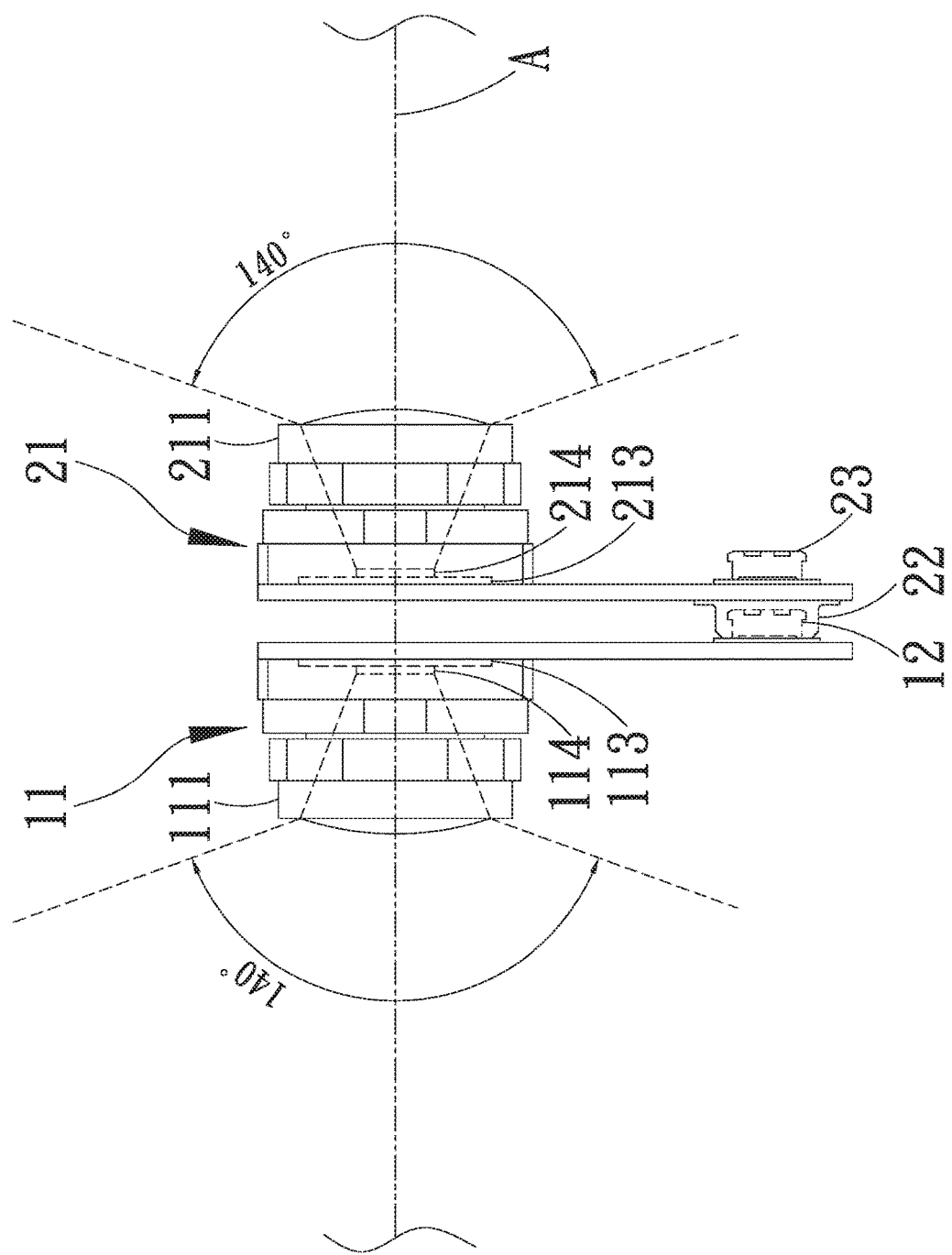
FIG. 3 is a view showing the application of the panoramic camera device of the present invention.

Please now refer to FIG. 3, which is a view showing the application of the panoramic camera device of the present invention. The first and second lens units 111, 211 are selectively wide-angle lenses with an angle of view larger than 140 degrees. The first and second lens units 111, 211 are respectively directed to two ends of the optical axis A. The images taken by the first and second lens units 111, 211 respectively pass through the first and second filters 114, 214. Thereafter, the first image processing unit 113 and the second image processing unit 213 convert the optical signal into electrical signal and then perform A/D conversion and picture processing to respectively generate a first image signal and a second image signal. After the first and second connection ports 12, 22 are connected, the signal output port 23 outputs the first and second image signals to the electronic device (not shown). Thereafter, the electronic device (not shown) performs image signal combination processing to achieve a complete panoramic picture. The first and second camera modules 11, 21 are back-to-back positioned in the same optical axis A. This structural design can produce an image signal with different fields of view but fully unified definition and fully synchronized picture. Moreover, the signal output port 23 outputs the image signals by one single line so that the successive panoramic image processing and combination are greatly simplified. Also, the back-to-back structural design reduces the number of the used camera modules. This lowers the total cost and simplifies the structure so that the panoramic camera device of the present invention has the advantages of small volume and light weight.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A panoramic camera device comprising:
  a first printed circuit board having a first surface and a second surface opposite to the first surface; a first camera module disposed on the first surface;
  a first connection port disposed on the second surface;
  a second printed circuit board having a third surface and a fourth surface opposite to the third surface, the fourth surface facing the second surface of the first printed circuit board;
  a second camera module and a signal output port both disposed on the third surface; and
  a second connection port disposed on the fourth surface, the first connection port on the second surface being connected with the second connection port on the fourth surface, wherein an empty gap is defined between the first and second printed circuit boards and adjacent to the interconnected first and second connection ports, the first camera module on the first surface and the second camera module on the third surface being back-to-back arranged and positioned in the same optical axis, and the signal output port outputting first and second image signals generated by the first and second camera modules respectively via one single line to an external electronic device,
  wherein the first camera module includes a first lens unit, a first lens seat unit, a first image processing unit and a first filter, the first lens seat unit being disposed on the first surface, the first lens unit being disposed on the first lens seat unit, the first image processing unit being disposed on the first surface corresponding to the first lens unit, the first filter being disposed on the first image processing unit corresponding to the first lens unit.

2. The panoramic camera device as claimed in claim 1, wherein the first lens unit is selected from a group consisting of a wide-angle lens, a zoom lens or a telephoto lens.

3. The panoramic camera device as claimed in claim 1, wherein the second camera module includes a second lens unit, a second lens seat unit, a second image processing unit and a second filter, the second lens seat unit being disposed on the third surface, the second lens unit being disposed on the second lens seat unit, the second image processing unit being disposed on the third surface corresponding to the second lens unit, the second filter being disposed on the second image processing unit corresponding to the second lens unit.

4. The panoramic camera device as claimed in claim 3, wherein the second lens unit is selected from a group consisting of a wide-angle lens, a zoom lens or a telephoto lens.

5. The panoramic camera device of claim 1, wherein the empty gap between the first and second printed circuit boards has a thickness corresponding to a thickness size of the interconnected first and second connection ports.

\* \* \* \* \*